United States Patent
Kadu et al.

(10) Patent No.: US 10,397,576 B2
(45) Date of Patent: Aug. 27, 2019

(54) RESHAPING CURVE OPTIMIZATION IN HDR CODING

(71) Applicant: Dolby Laboratories Licensing Corporation, San Francisco, CA (US)

(72) Inventors: Harshad Kadu, Santa Clara, CA (US); Guan-Ming Su, Fremont, CA (US)

(73) Assignee: Dolby Laboratoreis Licensing Corporation, San Francisco, CA (US)

(*) Notice: Subject to any disclaimer, the term of this patent is extended or adjusted under 35 U.S.C. 154(b) by 32 days.

(21) Appl. No.: 15/699,774

(22) Filed: Sep. 8, 2017

(65) Prior Publication Data
US 2018/0007356 A1 Jan. 4, 2018

Related U.S. Application Data

(63) Continuation-in-part of application No. PCT/US2017/039839, filed on Jun. 28, 2017.
(Continued)

(30) Foreign Application Priority Data

Jun. 29, 2016 (GB) .................................. 1611253.4

(51) Int. Cl.
*H04N 19/126* (2014.01)
*H04N 19/172* (2014.01)
(Continued)

(52) U.S. Cl.
CPC .......... *H04N 19/126* (2014.11); *G06T 5/009* (2013.01); *H04N 19/117* (2014.11);
(Continued)

(58) Field of Classification Search
CPC ...... H04N 19/80; H04N 19/85; H04N 1/6027; G06T 11/001; G06T 5/007; G06T 5/40;
(Continued)

(56) References Cited

U.S. PATENT DOCUMENTS 8,593,480 B1 11/2013 Ballestad
9,264,681 B2 2/2016 Gish
(Continued)

FOREIGN PATENT DOCUMENTS

EP 2200268 6/2010
EP 3029925 6/2016
(Continued)

OTHER PUBLICATIONS

Pouli et al., "Progressive Histogram Reshaping for Creative Color Transfer and Tone Reproduction", Bristol University, 2010 (Year: 2010).*
(Continued)

*Primary Examiner* — Alison Slater

(57) ABSTRACT

In a system for coding high dynamic range (HDR) images using lower-dynamic range (LDR) images, a reshaping function allows for a more efficient distribution of the codewords in the lower dynamic range images for improved compression. A trim pass of the LDR images by a colorist may satisfy a director's intent for a given "look," but may also result in unpleasant clipping artifacts in the reconstructed HDR images. Given an original forward reshaping function which maps HDR luminance values to LDR pixel values, a processor identifies areas of potential clipping and generates modified forward and backward reshaping functions to reduce the visibility of potential artifacts from the trim pass process while preserving the director's intent.

19 Claims, 8 Drawing Sheets

Related U.S. Application Data

(60) Provisional application No. 62/356,087, filed on Jun. 29, 2016.

(51) Int. Cl.

| | | |
|---|---|---|
| *G06T 5/00* | (2006.01) | |
| *G06T 5/40* | (2006.01) | |
| *G06F 17/16* | (2006.01) | |
| *H04N 19/117* | (2014.01) | |
| *H04N 19/186* | (2014.01) | |
| *H04N 19/154* | (2014.01) | |
| *H04N 19/182* | (2014.01) | |

(52) U.S. Cl.
CPC ......... *H04N 19/154* (2014.11); *H04N 19/182* (2014.11); *H04N 19/186* (2014.11); *G06T 2207/20208* (2013.01)

(58) Field of Classification Search
CPC ... G09G 5/02; G09G 2320/0271; G06F 17/16
See application file for complete search history.

(56) References Cited

U.S. PATENT DOCUMENTS

| | | | | |
|---|---|---|---|---|
| 2010/0157078 A1* | 6/2010 | Atanassov | ............... | G06T 5/007 348/222.1 |
| 2010/0172411 A1* | 7/2010 | Efremov | ............... | H04N 19/136 375/240.12 |
| 2014/0050271 A1* | 2/2014 | Su | ............... | H04N 19/136 375/240.26 |
| 2014/0307796 A1 | 10/2014 | Su | | |
| 2017/0026646 A1* | 1/2017 | Minoo | ............... | H04N 19/124 |
| 2017/0085889 A1* | 3/2017 | Baylon | ............... | H04N 19/124 |
| 2019/0012772 A1* | 1/2019 | Michelini | ............... | G06T 5/009 |

FOREIGN PATENT DOCUMENTS

| | | |
|---|---|---|
| WO | 2012/142506 | 10/2012 |
| WO | 2016/140954 | 9/2016 |
| WO | 2017/003525 | 1/2017 |
| WO | 2017/165494 | 9/2017 |

OTHER PUBLICATIONS

Mai et al., "Optimizing a Tone Curve for Backward-Compatible High Dynamic Range Image and Video Compression", IEEE Transactions on Image Processing (Year: 2011).*

Olivier, Y. et al "HDR CE2-related: some experiments on ETM with Dual Grading Input" Joint Collaborative Team on Video Coding of ITU-T SG 16 WP 3 and ISO/IEC JTC 1/SC 29/WG11, 23rd meeting: San Diego, USA, Feb. 19-26, 2016.

Minoo, K. et al "Description of the Reshaper Parameters Derivation Process in ETM reference Software" Joint Collaborative Team on Video Coding of ITU-T SG 16 WP3 and ISO/IEC JTC1/SC 29/WG 11, 23rd meeting: San Diego, USA, Feb. 19-26, 2016.

ITU REC.ITU-R BT.1886 "Reference Electro-Optical Transfer Function for Flat Panel Displays Used in HDTV Studio Production" Mar. 2011.

SMPTE ST 2084:2014 "High Dynamic Range EOTF of Mastering Reference Displays".

Stessen, J. et al "Chromaticity Based Color Signals for Wide Color Gamut and High Dynamic Range" ISO/IEC JTC1/SC29/WG11 MPEG 2014, Oct. 2014.

ITU-R Report BT 2390-0, "High Dynamic Range Television for Production and International Programme Exchange" 2016.

* cited by examiner

RESHAPING CURVE OPTIMIZATION IN HDR CODING

CROSS REFERENCE TO RELATED APPLICATIONS

The present application is continuation in part (CIP) of PCT Application Ser. No. PCT/US2017/039839, filed on Jun. 28, 2017, which claims the benefit of priority to U.S. Provisional Application No. 62/356,087 and British Patent Application No. 1611253.4, both filed on Jun. 29, 2016, the disclosures of which are incorporated herein by reference in their entirety.

TECHNOLOGY

The present invention relates generally to images. More particularly, an embodiment of the present invention relates to optimizing a reshaping curve for improved coding of high dynamic range images and video.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR or VDR nonetheless represents a wide DR breadth and may also be referred to as HDR. For notation purposes, the terms EDR, VDR, and HDR may be used interchangeably to denote a dynamic range higher than standard dynamic range (SDR).

In practice, images comprise one or more color components (e.g., luma Y and chroma Cb and Cr), where each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such displays thus typify a lower dynamic range (LDR), also referred to as a standard dynamic range (SDR), in relation to HDR, VDR, or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF, commonly referred to as "PQ" for perceptual quantization curve, is defined in SMPTE ST 2084:2014 "High Dynamic Range EOTF of Mastering Reference Displays," which is incorporated herein by reference in its entirety.

As used herein, the term "forward reshaping" denotes a process of sample-to-sample or codeword-to-codeword mapping of a digital image from its original bit depth and original codewords distribution or representation (e.g., gamma or PQ, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the reshaped signal, the receiver may apply an "inverse (or backward) reshaping function" to restore the signal to its original codeword distribution.

As appreciated by the inventors here, improved techniques for encoding and decoding reversible production-quality reshaped video data that can be used to support a wide variety of display devices are desired. Methods of this invention can be applicable to a variety of video content, including, but not limited to, content in standard dynamic range (SDR) and/or high-dynamic range (HDR).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
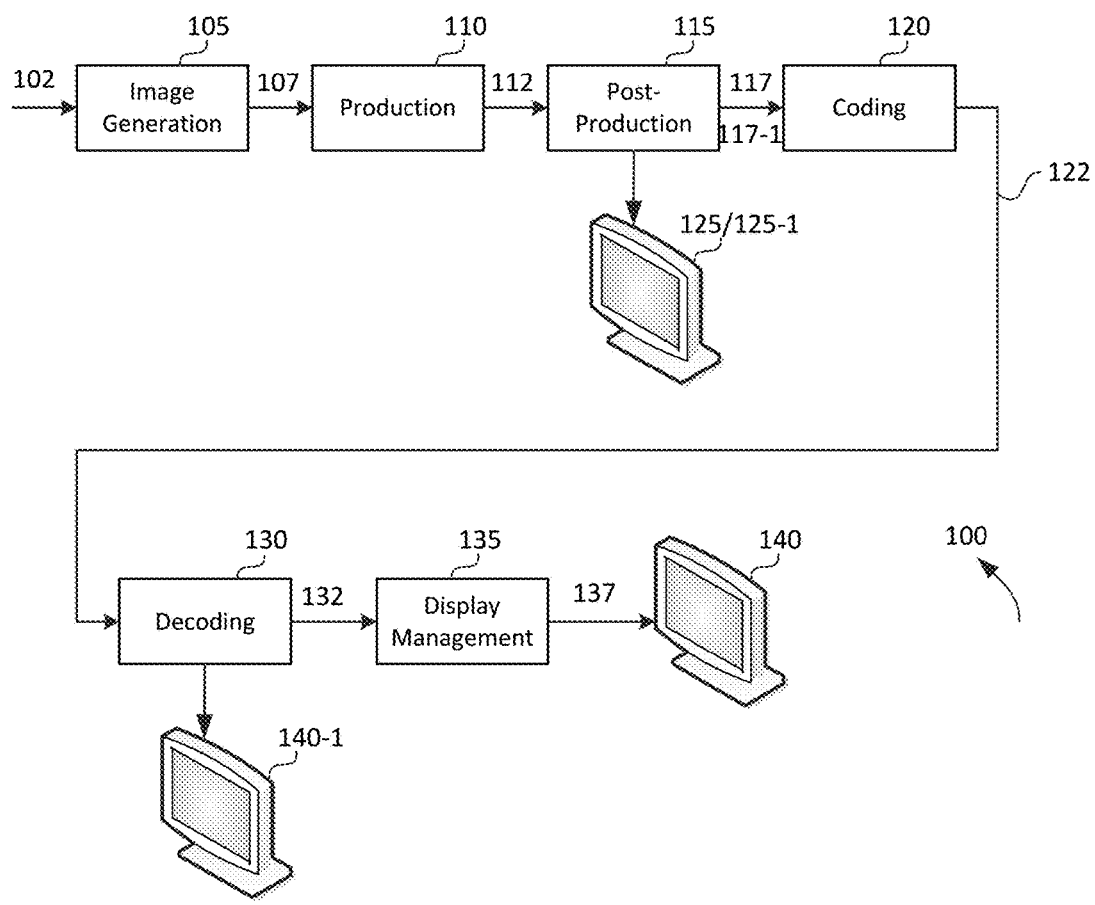
FIG. 1A depicts an example process for a video delivery pipeline.

Encoding and decoding reversible production-quality reshaped video data is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, to avoid unnecessarily occluding, obscuring, or obfuscating the present invention.

Overview

Example embodiments described herein relate to encoding high-dynamic range video data using forward and backward reshaping curves. In an encoder comprising one or more processors, a processor receives a first video frame in a first dynamic range (HDR) and a second video frame in a second dynamic range (LDR), wherein the first and the second frames represent the same scene, and the first dynamic range is higher or equal to the second dynamic range. The processor also receives a tone-mapping function which maps luminance pixel values from the first dynamic range to luminance pixel values in the second dynamic range, and a first cumulative density function (CDF) matching curve which maps luminance values from the first dynamic range to reshaped luminance values in the second dynamic range. The processor generates a first histogram of luminance values based on luminance pixel values in the first video frame and a second histogram of luminance values based on luminance pixel values in the second video frame. Next, it identifies one or more histogram peaks based on the first and second histograms of luminance values and the first CDF matching curve, and generates a first set of luminance pixel ranges in the first dynamic range based on the one or more histogram peaks and the first CDF matching curve. Next, it generates a second set of luminance pixel ranges in the first dynamic range based on the first set of luminance pixel ranges, the first CDF matching curve, and the tone-mapping function. Next, it generates a second CDF matching curve based on the second set of luminance pixel ranges, the first CDF matching curve, and the tone-mapping function, and applies the second CDF matching curve to generate a) a reshaped video frame to be compressed in the second dynamic range, and b) a backward reshaping function to be used by a decoder to reconstruct and output an HDR frame based on a decoded version of the received reshaped video frame.

In another embodiment, in an encoder, a processor receives a first video frame in a first dynamic range. It applies a tone-mapping function to the first video frame to generate a second video frame in a second dynamic range, wherein the tone-mapping function maps luminance pixel values from the first dynamic range to luminance pixel values in the second dynamic range. Next a trim-pass is applied to the second video frame to generate a third video frame in the second dynamic range. The processor generates based on the first and the third video frames a first cumulative density function (CDF) matching curve which maps luminance values from the first dynamic range to reshaped luminance values in the second dynamic range. Next, it generates a second CDF matching curve based on the first and third video frames, the first CDF matching curve, and the tone-mapping function, and it generates a backward reshaping function based on the second CDF matching curve. A processor may apply the second CDF matching curve to generate a) a reshaped video frame to be compressed in the second dynamic range, and b) a backward reshaping function to be used by a decoder to reconstruct and output an HDR frame based on a decoded version of the received reshaped video frame.

Example Video Delivery Processing Pipeline

FIG. 1A depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor for post-production editing (115). Post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at post-production editing (115) to yield a high dynamic range version comprising input images (117) of a high dynamic range and a relatively narrow dynamic range version comprising reference tone-mapped images (117-1) of a relatively narrow dynamic range (e.g., SDR, etc.). The reference tone-mapped images may, but is not necessarily limited to only, be a non-reversible tone-mapped version of the input images of the high dynamic range. During post-production editing (115), the input images of the high dynamic range may be viewed on a first reference display (125) that supports the high dynamic range by a colorist who is performing post-production editing operations on the input images of the high dynamic range. During post-production editing (115), the reference tone-mapped images of the relatively narrow dynamic range may also be viewed on a second reference display (125-1) that supports the relatively narrow dynamic range by the same or a different colorist who is performing post-production editing operations on the reference tone-mapped images of the relatively narrow dynamic range.

Figure 1B:
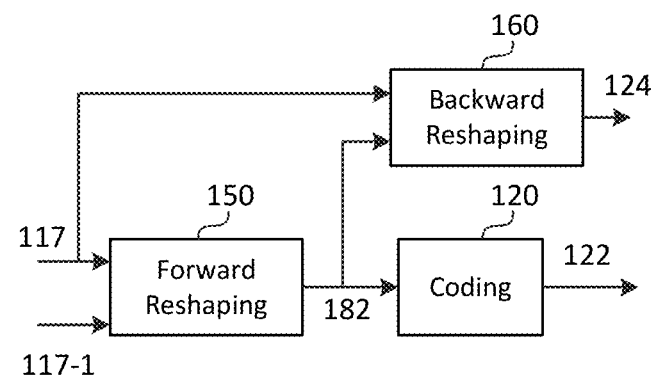
FIG. 1B depicts an example process for video data compression using forward reshaping.

Following post-production editing (115), the input images (117) of the high dynamic range and the reference tone-mapped images (117-1) of the relatively narrow dynamic range are delivered to coding block (120) for generating forward reshaped images to be included in a code bit stream (122). The code bit stream (122) is to be delivered downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate the coded bit stream (122). As depicted in FIG. 1B, in some embodiments, the coded bit stream (122) is encoded with a compressed version of a forward reshaped image (182) generated from forward reshaping the input images (117) of the high dynamic range (e.g., by using forward reshaping (160) in FIG. 1B). In some embodiments, the forward reshaped images (182) preserve the artistic intent with which the reference tone-mapped images are generated in the post-production editing (115). As the forward reshaped images (182) largely preserves the artistic intent, the forward reshaped images (182) may be encoded into video data in a video signal that is backward compatible with a wide variety of display devices (e.g., SDR displays, etc.) of the relatively narrow dynamic range. In an example, the video signal encoded with the forward reshaped images (182) may be a single-layer backward compatible video signal. In another example, the video signal encoded with the forward reshaped images (182) may be a multi-layer backward compatible video signal; for instance, the video signal encoded with the forward reshaped images (182) may represent a base-layer backward-compatible (component) video signal of the multi-layer video signal (e.g., a dual-layer video signal, etc.).

Additionally, optionally, or alternatively, the coded bit stream (122) is further encoded with image metadata (124) including, but not limited to, backward reshaping metadata that can be used by downstream decoders to perform backward reshaping on the forward reshaped images (182) in order to generate backward reshaped images (e.g., output 162 of FIG. 1C) identical to or approximating the input images (117) of the high dynamic range images. The reference tone-mapped images (117-1) may not be reversible in that the input images (117) of the high dynamic range may not be reconstructed or predicted by inversely mapping the reference tone-mapped images (117-1). For example, image details in the input images (117) represented by codewords of certain clipped ranges may be (e.g., entirely, etc.) clipped and lost in the reference tone-mapped images (117-1) as a part of producing the reference tone-mapped images (117-1) under the colorist's control. The reference tone-mapped images (117-1) are not reversible in the sense that the lost image details cannot be reconstructed/restored by inversely mapping the reference tone-mapped images (117-1). On the other hand, the forward reshaped images (182) are reversible in that the input images (117) of the high dynamic range may be reconstructed or predicted by inversely mapping the forward reshaped images (182) using backward reshaping. For example, image details in the input images (117) clipped and lost in the reference tone-mapped images (117-1) as a part of producing the reference tone-mapped images (117-1) under the colorist's control are not clipped and lost in the forward reshaped images (182). The forward reshaped images (182) are reversible in the sense that the image details lost in the reference tone-mapped images (117-1) can be (e.g., entirely, substantially, etc.) reconstructed/restored by inversely mapping the forward reshaped images (182).

Figure 1C:
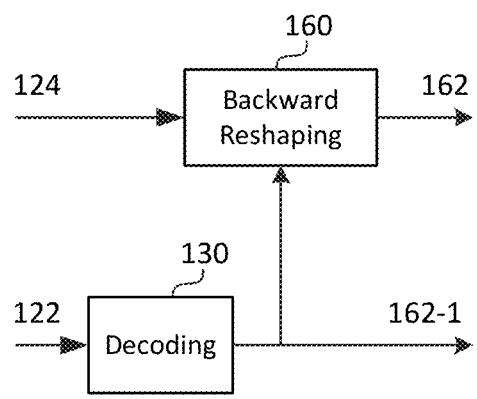
FIG. 1C depicts an example video data decompression using backward reshaping.

As depicted in FIG. 1C, in a receiver, the coded bit stream (122) is decoded by decoding block (130) to generate decoded images, which may be the same as the forward reshaped images (182) of the relatively narrow dynamic range (e.g., SDR, etc.). In some embodiments, the receiver may be attached to a first target display (140-1). In scenarios in which the first target display (140-1) supports the relatively narrow dynamic range, the decoded images (162-1), which approximate the reference tone-mapped images edited with the artistic content, are directly watchable on a first target display (140-1), which may be of similar characteristics as the second reference display (125-1). In some embodiments, the receiver may be attached to a second target display (140), which may have different dynamic range characteristics than the first reference display (125). In that case, decoding block (130) is followed by backward reshaping (160) to generate an identical version or a close approximation of the input images (117) of high dynamic range. Additionally, optionally, or alternatively, a display management block (135)—which may be in the receiver, in the target display (140), or in a separate device—further adjusts the backward reshaped images (132 or 162) to the characteristics of the second target display (140) by generating display-mapped signal (137) adapted to the characteristics of the second target display (140).

Signal Quantization

Some digital interfaces for video delivery, such as the Serial Digital Interface (SDI), are limited to 12 bits per pixel per component. Furthermore, some compression standards, such as H.264 (or AVC) and H.265 (or HEVC), are limited to 10-bits per pixel per component. Therefore, efficient encoding and/or quantization is required to support HDR content, with dynamic range from approximately 0.001 to 10,000 cd/m$^2$ (or nits), within existing infrastructures and compression standards. Techniques as described herein can be used to support any in a variety of PQ-based EOTFs, non-PQ-based EOTFs, color spaces, dynamic ranges, etc.

Reshaped Signal Generation

Given a pair of corresponding high dynamic range and relatively narrow dynamic range images, that is, a pair of images that represent the same scene but at different levels of dynamic range, one image of the pair may be approximated in terms of the other image in the pair, in some or all channels of codewords in the images.

FIG. 1B and FIG. 1C depict example processes for generating a forward reshaped signal comprising forward reshaped images of a relatively narrow dynamic range (e.g., Rec. 709, etc.) and for reconstructing based on the forward reshaped signal and backward reshaping metadata therein images of a high dynamic range (e.g., Rec. 2020, ICtCp, etc.).

In an encoder, the forward reshaping module (150) computes a forward reshaping function or forward look-up table (FLUT) that maps pixel values of the reference HDR input (117) into pixel values of a reshaped SDR signal (182). Examples of computing such a function are described in U.S. Provisional Patent Application Ser. No. 62/404,307, "Inverse Luma/Chroma Mappings with Histogram Transfer and Approximation," by B. Wen et al., filed on Oct. 5, 2016, to be referred to as the '307 Application, which is incorporated herein by reference in its entirety.

An encoder, may use the forward reshaping function (150) to generate a backward reshaping function (160) or a backward look-up table (BLUT), which is communicated downstream to a decoder (e.g., FIG. 1C) using metadata (124). A backward reshaping function maps pixel values of a reshaped SDR signal (e.g., output 162-1) into pixel values of a HDR signal (162), which approximates the original HDR signal 117.

In a decoder, (e.g., FIG. 1C), legacy devices, with no HDR playback capability, may still view the SDR reshaped signal (162-1) on an SDR display (e.g., 140-1). Given the input metadata (124) and the decoded SDR signal (162-1), HDR receivers will generate an HDR signal (162) to be viewed on an HDR display (e.g., 140).

As used herein, forward reshaped images decoded from a coded bit stream refer to reshaped images that approximate (e.g., with the same luma look, etc.) the reference tone-mapped images (117-1) that are generated with first specific artistic intent; the first specific artistic intent may be embodied in post-production editing (115) in which a colorist edits the reference tone-mapped images (117-1) while the colorist views the reference tone-mapped images on a second reference display 125-1 that supports the relatively narrow dynamic range.

By way of example but not limitation, the input images (117) after the post-production editing (115) may be represented in a variety of color formats, such as YCbCr using gamma, YCbCr using PQ, ICtCp using PQ, YCbCr using Hybrid Log-Gamma (HLG), etc. A forward reshaping block (150) analyzes the input images (117) in relation to the reference tone-mapped images (117-1) after the post-production editing (115). The forward reshaping block (150) generates optimized codeword mapping functions (or optimized forward reshaping functions) which map the input images (117) to optimized re-quantized images (or the forward reshaped images 182 of FIG. 1B) of the relatively narrow dynamic range (e.g., Rec. 709, SDR, HLG, etc.) in a reshaped domain. In some embodiments, the forward reshaped images (182) represented in the reshaped domain are forward reshaped from the input images (117) in such a manner that the forward reshaped images (182) relatively closely resemble the reference tone-mapped images (117) visually to viewers of the forward reshaped images (182) and the reference tone-mapped images.

In some embodiments, information (124) (e.g., backward reshaping metadata, etc.) about the reshaping process may be generated and communicated in the coding block (120) to downstream devices (such as decoders) with the forward reshaped images (182) in the coded bit stream (122). The decoding block (130) decodes the coded bit stream (122) into the decoded images, which are the forward reshaped images (182) in the reshaped domain previously encoded into the coded bit stream (122) in the coding block (120).

In some embodiments, signal SDR signal (117-1) may be derived based on a master HDR signal (117). In other embodiments, it is the HDR signal (117) that is derived from an original SDR signal (117-1).

In some embodiments, the generated SDR signal (117-1) based on HDR signal (117) may not have the desired "look." Then, a colorist may adjust "trim parameters" (commonly referred to as lift, gain, and gamma (LGG)) to achieve the desired effect. This process may be referred to as a "trim pass," and its main goal is to maintain the director's intent or look. As used herein, the term "trim pass" denotes a post-production process which may include trimming, rotating, cropping, flipping and adjusting the brightness, color and saturation of a video sequence to generate a sequence to be displayed on a display with a target dynamic range, typically lower than the dynamic range of the master. For example, given a movie mastered at 4,000 nits, a colorist may generate "trims" at 400, 500, and 1,000 nits. Such a trim pass may preserve artistic intent in the SDR signal, but may also introduce unpleasant clipping artifacts in the darks (the low intensity regions) or in the highlights (the high intensity regions). Such artifacts may be further exaggerated by the video coding process (122). To reduce such artifacts, one could try to change the LGG "trim" data itself; however, studios do not allow any changes of their data after a director's approval, and any such change would require an additional review process. Hence, as appreciated by the inventors, it would be beneficial to be able to reduce artifacts introduced by the EDR to SDR mapping process without changing the SDR signals, thus preserving the director's intent. Such a methodology is described next.

Reshaping Curve Optimization

Histogram Construction

Let $I_j^{vdr}(p)$ and $I_j^{sdr}(p)$ denote the luminance pixel components of the j-th VDR (also to be referred as EDR or HDR) and SDR input frames respectively, where p denotes the p-th pixel value in a frame. In an embodiment, each picture frame may be characterized be either letterbox bars (black bars at the top and bottom of a picture) or pillar bars (black bars at the left or right of a picture). In an embodiment, these areas are ignored so they don't affect the true pixel histograms of the picture itself. After discarding the letterbox and pillar box pixels, denote the index set of valid pixels for the j-th EDR and SDR images as $\Omega_j^{vdr}$ and $\Omega_j^{sdr}$ respectively.

Let s denote a value of an SDR pixel, let $B_T$ denote the bit depth of the target SDR display (e.g., $B_T=10$), and let $\Xi$ denote the identity function. Then one can construct a $2^{B_T}$-bin histogram for the j-th frame, denoted as $hist_j^{sdr}(s)$, from the reference SDR frame using:

$$hist_j^{sdr}(s) = \sum_{p \in \Omega_j^{sdr}} \Xi(I_j^{sdr}(p) = s), \quad s \in [0, 2^{B_T} - 1]. \quad (1)$$

For black frames, the set $\Omega_j^{sdr}$ is empty and the histogram for those frames has zeros in all the bins. As used herein, the term 'scene' denotes a sequence of consecutive frames in a video sequence. A scene typically represents a "shot" in a movie sequence, and frames within a scene typically have similar luma/chroma characteristics. Suppose there are F frames within a scene and the corresponding frame indices are 0, 1, . . . , F−1. Then, in an embodiment, a scene histogram $hist^{sdr}(s)$ represents the sum of all individual frame-histograms, where $$hist^{sdr}(s) = \sum_{j=0}^{F-1} hist_j^{sdr}(s), \quad s \in [0, 2^{B_T} - 1]. \quad (2)$$

Let v denote values of an EDR pixel, and let $B_I$ denote the bit depth of the input EDR signal (e.g., $B_I=16$). Then, one may construct a $2^{B_I}$-bin histogram for the j-th EDR frame, denoted as $hist_j^{vdr}(v)$, from the reference EDR frame as $$hist_j^{vdr}(v) = \sum_{p \in \Omega_j^{vdr}} \Xi(I_j^{vdr}(p) = v), \quad v \in [0, 2^{B_I} - 1]. \quad (3)$$

For the same scene, the EDR scene histogram $hist^{vdr}(v)$ can be expressed as, $$hist^{vdr}(v) = \sum_{j=0}^{F-1} hist_j^{vdr}(v), \ v \in [0, 2^{B_I} - 1]. \tag{4}$$

These two histograms will be used later on to optimize the reshaping function.

Forward Reshaping Based on CDF Matching

As described in the '307 Application, in an embodiment, one may generate a forward reshaping function by matching the cumulative density functions (CDF) between the SDR and EDR frames. A short overview of the technique is provided herein. The forward reshaping function or Forward LUT represents a mapping from a given EDR luma intensity v to SDR luma intensity s, that is, a mapping: $f_{cdf}(v) \to s$. In an embodiment, for CDF-related curve computations, one may still take into consideration letterbox and pillar box pixels as well. Let the subscript LB denote that letterbox and pillar box pixels are included. First one computes the SDR and EDR histograms including letterboxes i.e. $hist_{LB,norm}^{vdr}(v)$ and $hist_{LB,norm}^{sdr}(s)$. Then one can build the CDF functions $c^{sdr}(b)$ and $c^{vdr}(b)$ for a scene with F frames as:

For the SDR frames $$hist_{j,LB}^{sdr}(s) = \sum \Xi(I_j^{sdr}(p) = s), \ s \in [0, 2^{B_T} - 1], \tag{5}$$

$$hist_{LB}^{sdr}(s) = \sum_{j=0}^{F-1} hist_{j,LB}^{sdr}(s), \ s \in [0, 2^{B_T} - 1],$$

$$hist_{LB,norm}^{sdr}(s) = \frac{hist_{j,LB}^{sdr}(s)}{\sum_{l=0}^{l=2^{B_T}-1} hist_{j,LB}^{sdr}(l)}, \ s \in [0, 2^{B_T} - 1],$$

$$c^{sdr}(b) = \sum_{s=0}^{b} hist_{LB,norm}^{sdr}(s), \ s \in [0, 2^{B_T} - 1].$$

For the EDR frames $$hist_{j,LB}^{vdr}(v) = \sum \Xi(I_j^{vdr}(p) = v), \ s \in [0, 2^{B_I} - 1], \tag{6}$$

$$hist_{LB}^{vdr}(v) = \sum_{j=0}^{F-1} hist_{j,LB}^{vdr}(v), \ s \in [0, 2^{B_I} - 1],$$

$$hist_{LB,norm}^{vdr}(v) = \frac{hist_{j,LB}^{vdr}(v)}{\sum_{l=0}^{l=2^{B_I}-1} hist_{LB}^{vdr}(l)}, \ s \in [0, 2^{B_I} - 1],$$

$$c^{vdr}(b) = \sum_{v=0}^{b} hist_{LB,norm}^{vdr}(v), \ s \in [0, 2^{B_I} - 1].$$

To construct a CDF matching curve, one needs to find the mapped SDR value $\hat{s}$ for EDR luma intensity $\hat{v}$. First, for an EDR luma intensity value $\hat{v}$, one finds the corresponding CDF value c, such that, $c_j^{vdr}(\hat{v})=c$. Then the value of SDR intensity $\hat{s}$ that has the same CDF value (e.g., $c_j^{sdr}(\hat{s})=c$) is the mapped SDR value for $\hat{v}$. This yields the equality $c_j^{sdr}(\hat{s})=c_j^{vdr}(\hat{v})=c$, specifying that input EDR value $\hat{v}$ should map to $\hat{s}$. Repeating the process for different EDR values $\hat{v}$ yields the SDR mapping for all the EDR values and determines the CDF matching curve or LUT. In practice, the CDF curves will be stored as discrete values. For such cases, if the value c is not present in $c_j^{sdr}$, then missing values may be determined using linear interpolation.

Artifact Detection Using Histogram Peak Detection

In an embodiment, artifacts due to trims, such as clipping, may be determined based on detecting peaks in the histogram of the SDR images. First, the scene histogram may be smoothened out with a moving average filter to get $hist_{smooth}^{sdr}(s)$. For example, for odd length filters of size $2\omega+1$, (e.g., $\omega=5$) smoothing may be performed as $$hist_{smooth}^{sdr}(s) = \frac{\sum_{l=\max(s-\omega,0)}^{l=\min(s+\omega,2^{B_T}-1)} hist^{sdr}(l)}{\min(s+\omega, 2^{B_T}-1) - \max(s-\omega, 0) + 1}, \tag{7}$$

$$s \in [0, 2^{B_T} - 1].$$

For even length filters of size $2\omega$, equation (7) changes to $$hist_{smooth}^{sdr}(s) = \frac{\sum_{l=\max(s-\omega+1,0)}^{l=\max(s+\omega,2^{B_T}-1)} hist^{sdr}(l)}{\min(s+\omega, 2^{B_T}-1) - \max(s-\omega+1, 0) + 1}, \tag{8}$$

$$s \in [0, 2^{B_T} - 1].$$

In an embodiment, one may apply an element-wise difference between the original and the smooth histograms to reveals potential peaks indicating trim-pass-related artifacts. Let $$hist_{peaks}^{sdr}(s) = \max(0, hist^{sdr}(s) - hist_{smooth}^{sdr}(s)), s \in [0, 2^{B_T}-1], \tag{9}$$

denote a histogram of detected peaks. The histogram of peaks may be normalized to get the strength of a peak in each bin relative to other bins. The normalized peak histogram is denoted by $hist_{peaks}^{sdr,norm}(s)$, where $$hist_{peaks}^{sdr,norm}(s) = \frac{hist_{peaks}^{sdr}(s)}{\sum_{l=0}^{2^{B_T}-1} hist_{peaks}^{sdr}(l)}, \ s \in [0, 2^{B_T} - 1]. \tag{2}$$

In an embodiment, peaks in the normalized SDR peak histogram are determined based on two thresholds: $Thresh_{peak}^{reg}$ and $Thresh_{peak}^{ext}$. Typical values of these thresholds are $Thresh_{peak}^{reg}=0.1$ and $Thresh_{peak}^{ext}=0.6$, which were computed heuristically after analyzing several sample sequences. Thus, bins in the histogram $hist_{peaks}^{sdr,norm}(s)$ having values above these thresholds are potential peaks, which, without limitation, can be characterized as "regular" or "extreme." That is:

If $hist_{peaks}^{sdr,norm}(s) > Thresh_{peak}^{reg} \Rightarrow$ possible regular peak at s (11a)

If $hist_{peaks}^{sdr,norm}(s) > Thresh_{peak}^{ext} \Rightarrow$ extreme peak at s (11b)

In an embodiment, to be classified as a regular peak, a peak which satisfies (11a) should also satisfy a cross-domain variance constraint to be discussed in the next section. On the other hand, for extreme peaks satisfying equation (11b), one can skip the variance check. If a peak satisfies both the extreme and the regular peak thresholds, then it is classified as an extreme peak.

Artifact Detection Using Cross-domain Variance

As a result of the trim pass, if there is clipping, it is expected that a wide range of EDR luma values will be mapped to a few SDR luma values. For example, in one test sequence with trim in the highlights region, approximately 12,000 EDR codewords were mapped to only 36 SDR codewords. In the darks, approximately 10K EDR codewords were mapped to 10 SDR codewords. Such mappings imply that the span or variance of EDR codewords for those SDR codewords is larger than usual. This cross-domain variance provides valuable cues in detecting trim-related artifacts.

Cross-domain variance is computed based on the CDF matching curve $f_{cdf}(v) \to s$ and the reference EDR histogram $hist^{vdr}(v)$. As discussed, the CDF Forward LUT $f_{cdf}(v) \to s$ maps EDR values into SDR values. Generally, multiple EDR values map to the same SDR value. For each SDR bin s, let $[v_{s,min}\ v_{s,max}]$ denote the range of EDR values that map to s using the CDF matching LUT. The equations for computing these values are, $$v_{s,min} = \min\{v | f_{cdf}(v) = s\},$$

$$v_{s,max} = \max\{v | f_{cdf}(v) = s\}. \quad (12)$$

Then, the cross-domain mean $\overline{\mu(s)}$ and the cross-domain total variance $\overline{\sigma^2(s)}$ are computed as follows:

$$\overline{\mu(s)} = \frac{\sum_{l=v_{s,min}}^{v_{s,max}} (hist^{vdr}(l) \times v)}{\sum_{l=v_{s,min}}^{v_{s,max}} hist^{vdr}(l)}, s \in [0, 2^{B_T} - 1], \quad (13)$$

$$\overline{\sigma^2(s)} = \sum_{l=v_{s,min}}^{v_{s,max}} \left(hist^{vdr}(l) \times (l - \overline{\mu(s)})^2\right), s \in [0, 2^{B_T} - 1].$$

Since $\overline{\sigma^2(s)}$ is a $2^{B_T}$ bin vector, the cross-domain total variance calculated for each SDR bin may be normalized to get $\overline{\sigma^2(s)}_{norm}$, where $$\overline{\sigma^2(s)}_{norm} = \frac{\overline{\sigma^2(s)}}{\sum_{l=0}^{2^{B_T}-1} \overline{\sigma^2(l)}}, s \in [0, 2^{B_T} - 1]. \quad (14)$$

In an embodiment, the bins with magnitude higher than $Thresh_{var}^{reg}$ (e.g., $Thresh_{var}^{reg} = 0.1$) are considered as candidates for regular peaks:

If $\overline{\sigma^2(s)}_{norm} > Thresh_{var}^{reg} \Rightarrow$ possible regular peak at s. (15)

The information from the SDR-based-histogram luma peaks (see equation (11)) and the cross-domain-based variance peaks (equation (15)) is sent over to the trim pass clipping detection routine to decide whether trim pass clipping correction is required or not. In some embodiments, the selection and processing of "peaks" may be further refined to simplify subsequent operations. For example, based on the location of the bin ŝ where a peak was detected, the clipping is categorized as "low-" or "high-intensity" clipping. The categorization is as follows:

a. Low intensity/dark region clipping $$\hat{s}_{low} = \hat{s} \text{ if } \hat{s} \in [0, 2^{B_T - 1}),$$

b. High intensity/highlight region clipping $$\hat{s}_{high} = \hat{s} \text{ if } \hat{s} \in [2^{B_T - 1}, 2^{B_T}). \quad (16)$$

In determining the final or dominant peaks, the highlight and dark regions are treated independently. Suppose there are multiple regular peaks in the high intensity region, then one selects the peak with the smallest value of the bin ŝ. For the low intensity region, the peak with the largest value is selected. The other peaks are neglected. In other words, peaks closest to the mid-tones (which are to be preserved) are preferred over other peaks.

If the highlight or dark region has multiple regular peaks and one extreme peak, then only the extreme peak is considered in that region, and the regular peaks in that region are abandoned. As the threshold for an extreme peak is rather high, typically, there cannot be more than one extreme peak in the entire SDR histogram.

Finally, the following information about each peak is handed over to the reshaping function optimization mechanism: a) its category (low or high) intensity, b) its location (bin ŝ), and c) its severity (regular or extreme). For example, in an embodiment:

For a low intensity peak,
 a. Category: Low intensity
 b. Location: $\hat{s}_{low} = \hat{s}$ if $\hat{s} \in [0, 2^{B_T - 1})$
 c. Severity:
  severity=1 regular peak
  severity=2 extreme peak
For a high intensity peak,
 a. Category: High intensity
 b. Location: $\hat{s}_{high} = \hat{s}$ if $\hat{s} \in [2^{B_T - 1}, 2^{B_T})$
 c. Severity:
  severity=1 regular peak
  severity=2 extreme peak In an embodiment, without limitation, and to simplify computations, there can be a maximum of two peaks; one in the high intensity region and one in the low intensity region; however, in most practical cases of interest, there is typically a single peak in either the highlights or the dark region.

Effects of Tone Mapping to Trim-Pass Regions

Let $v_{L,j} = \min\{I_j^{vdr}(p)\}$, $v_{H,j} = \max\{I_j^{vdr}(p)\}$, and $v_{M,j} = \text{average}\{I_j^{vdr}(p)\}$ denote the minimum, maximum, and average luminance pixel values in the j-th EDR frame (117). Then, within a scene with F frames, one can compute $$v_L = \min\{v_{L,j} | j = 0, \ldots, F - 1\},$$

$$v_H = \max\{v_{H,j} | j = 0, \ldots, F - 1\},$$

$$v_M = \frac{1}{F} \sum_{j=0}^{F-1} v_{M,j},$$

denoting respectively the minimum, maximum, and average luminance pixel values within the scene.

As discussed in U.S. Pat. No. 8,593,480, which is incorporated herein by reference in its entirety, given these values and corresponding min, average, and maximum luminance values in a target display (125-1), one may determine a tone-mapping curve, mapping the input EDR values to corresponding SDR values. Denote such a curve as T(v). In an embodiment, such a tone-mapping or display-mapping (DM) curve may be used to better determine the range of EDR values where the original CDF matching function needs to be adjusted so that artifacts due to the trim pass are reduced.

Knowing the bin index of a regular or extreme peaks ŝ does not suffice. Often a trim pass affects pixels into the bins surrounding the peak. Thus, one needs to also identify those bins close to peak ŝ that are affected by the trim pass. An example process for determining this affected region is described below.

1) Let $\mathfrak{R}_{sdr\_ref}$ indicate the region affected by the trim pass in reference input SDR, where $s_L$ and $s_H$ denote, respectively, the minimum and maximum values in the SDR signal.

Low Intensity Trim

Suppose clipping is detected in the low intensity region $\hat{s}_{low} \in [0, 2^{B_T-1})$, then $$\mathfrak{R}_{sdr\_ref}^{low} = [s_L, \hat{s}_{low} + \Delta \times severity], \quad (17)$$

is a function of the severity of each peak, where $\Delta$ is a constant set, for example, to 20 for 10-bit sequences and to 5 for 8-bit sequences.

High Intensity Trim

For a detected trim in the high intensity region $\hat{s}_{high} \in [2^{B_T-1}, 2^{B_T})$, then $$\mathfrak{R}_{sdr\_ref}^{high} = [\hat{s}_{high} - \Delta \times severity, s_H], \quad (18)$$

and $$\mathfrak{R}_{sdr\_ref} = \mathfrak{R}_{sdr\_ref}^{low} \cup \mathfrak{R}_{sdr\_ref}^{high}. \quad (19)$$

2) Given the trim-affected SDR range $\mathfrak{R}_{sdr\_ref}$, the equivalent EDR range $\mathfrak{R}_{edr}$ can be found using the original CDF matching LUT. If the forward LUT maps EDR values to SDR values, $f_{cdf}(v) \to s$, then one may apply the corresponding backward mapping to identify $\mathfrak{R}_{edr}$.

Low Intensity Trim

Suppose the minimum corresponding EDR value for the SDR value $\hat{s}_{low} + \Delta \times severity$ is $\rho_{cdf}^{pre\_low}$, then the EDR range $\mathfrak{R}_{edr}^{low}$ can be expressed as follows. Let $\rho_{cdf}^{pre\_low}$ denote a preliminary estimate.

$$\rho_{cdf}^{pre\_low} = \min\{v | f_{cdf}(v) = \hat{s}_{low} + \Delta \times severity\},$$

then $$\mathfrak{R}_{edr}^{low} = [v_L, \rho_{cdf}^{pre\_low}]. \quad (20)$$

High Intensity Trim

Let $\rho_{cdf}^{pre\_high}$ be the highest corresponding EDR values for the SDR value $\hat{s}_{high} - \Delta \times severity$ obtained from the CDF curve. Then the equivalent EDR range is $\mathfrak{R}_{edr}^{high}$.

$$\rho_{cdf}^{pre\_high} = \max\{v | f_{cdf}(v) = \hat{s}_{high} - \Delta \times severity\},$$

$$\mathfrak{R}_{edr}^{high} = [\rho_{cdf}^{pre\_high}, v_H], \quad (21)$$

and $$\mathfrak{R}_{edr} = \mathfrak{R}_{edr}^{low} \cup \mathfrak{R}_{edr}^{high}. \quad (22)$$

Figure 2:
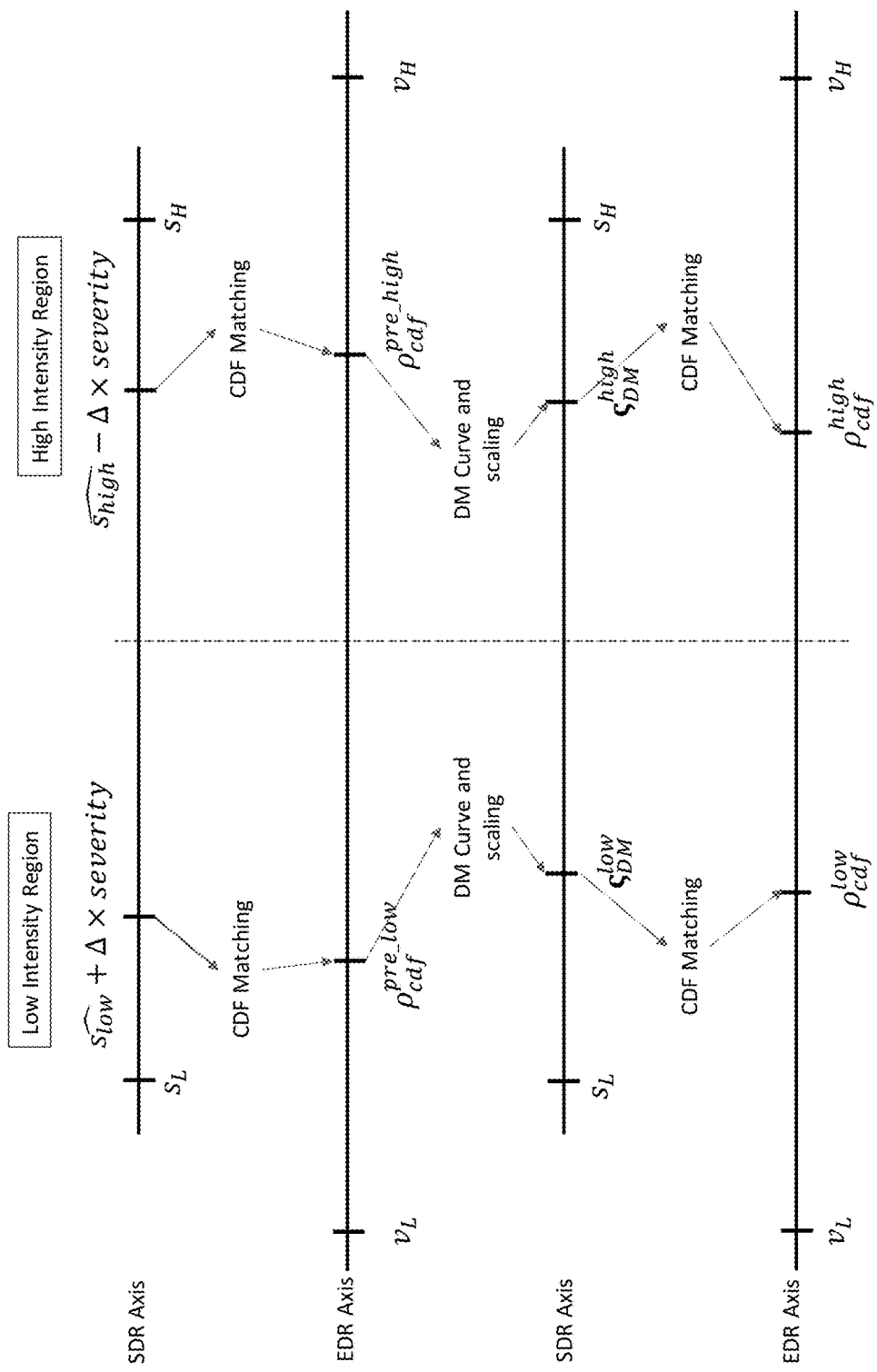
FIG. 2 depicts example flows of dynamic range remapping according to an embodiment of this invention.

Examples of these process flows are depicted in the top two axes of FIG. 2

3) Now that the range of EDR pixel intensities affected by trim pass, i.e., $\mathfrak{R}_{edr}$, is known, one may apply the DM curve T(v) to determine the expected location of this range in the reshaped SDR domain $\mathfrak{R}_{sdr\_rsp}$ (e.g., reshaped SDR signal (182)). Namely, $\mathfrak{R}_{sdr\_rsp}^{low} = [s_L, \zeta_{DM}^{low}]$ for a low intensity trim, and $\mathfrak{R}_{sdr\_rsp}^{high} = [\zeta_{DM}^{high}, s_H]$ for a high intensity trim. The SDR values $\zeta_{DM}^{high}$ and $\zeta_{DM}^{low}$ are computed with the help of the DM curve, as will be described next, and $$\mathfrak{R}_{sdr\_rsp} = \mathfrak{R}_{sdr\_rsp}^{low} \cup \mathfrak{R}_{sdr\_rsp}^{high}. \quad (23)$$

In an embodiment, the DM output range [T($v_L$), T($v_H$)] is linearly scaled to the range of the reference SDR, i.e. [$s_L$, $s_H$]. Let the slope of such a linear mapping be denoted as $$slope = \frac{s_H - s_L}{T(v_H) - T(v_L)}, \quad (24)$$

then the expected reshaped SDR values $\zeta_{DM}^{high}$ and/or $\zeta_{DM}^{low}$ for the affected EDR pixels can be found using the following equations.

Low Intensity Trim $$\zeta_{DM}^{low} = \max(slope \times \{T(\rho_{cdf}^{pre\_low}) - T(v_L)\} + s_L, \hat{s}_{low} + \Delta \times severity). \quad (25a)$$

High Intensity Trim $$\zeta_{DM}^{high} = \min(slope \times \{T(\rho_{cdf}^{pre\_high}) - T(v_L)\} + s_L, \hat{s}_{high} - \Delta \times severity). \quad (25b)$$

4) Equation (25) provides the expected range of trim artifacts in reshaped SDR $\mathfrak{R}_{sdr\_rsp}$ for the trim-affected EDR range $\mathfrak{R}_{edr}$. The corresponding output EDR values (e.g., EDR output 162) for reshaped SDR values $\zeta_{DM}^{high}$ and $\zeta_{DM}^{low}$ are denoted as $\rho_{cdf}^{high}$ and $\rho_{cdf}^{low}$ respectively, where $$\rho_{cdf}^{low} = \min\{v | f_{cdf}(v) = \zeta_{DM}^{low}\},$$

$$\rho_{cdf}^{high} = \max\{v | f_{cdf}(v) = \zeta_{DM}^{high}\}. \quad (26)$$

To summarize, the trim-affected reference SDR pixels span the range $\mathfrak{R}_{sdr\_ref}$ and the corresponding EDR range is $\mathfrak{R}_{edr}$. But these EDR intensities should have ideally spanned the SDR range $\mathfrak{R}_{sdr\_rsp}$, in absence of trim pass. Since the goal is to preserve the mid-tones, one cannot completely remap all the EDR pixels to SDR. Instead, by taking also into consideration the tone mapping function being used, one remaps the EDR ranges $\mathfrak{R}_{edr}^{low} = [v_L, \rho_{cdf}^{low}]$ and/or $\mathfrak{R}_{edr}^{high} = [\rho_{cdf}^{high}, v_H]$. The EDR values $\rho_{cdf}^{high}$ and $\rho_{cdf}^{low}$ are denoted as the merging points in the high and low intensity regions since they are determined by combining the characteristics of an original CDF matching function with the characteristics of a tone-mapping function. An example summary of the processes to determine these merging points is depicted in FIG. 2.

The SDR region between ($\zeta_{DM}^{low}$, $\zeta_{DM}^{high}$) is regarded as the mid-tones and should not be altered. Equivalently, the mapping for EDR range ($\rho_{cdf}^{low}$, $\rho_{cdf}^{high}$) in the CDF matching curve that corresponds to the mid-tone, should not be changed.

Figure 3A:
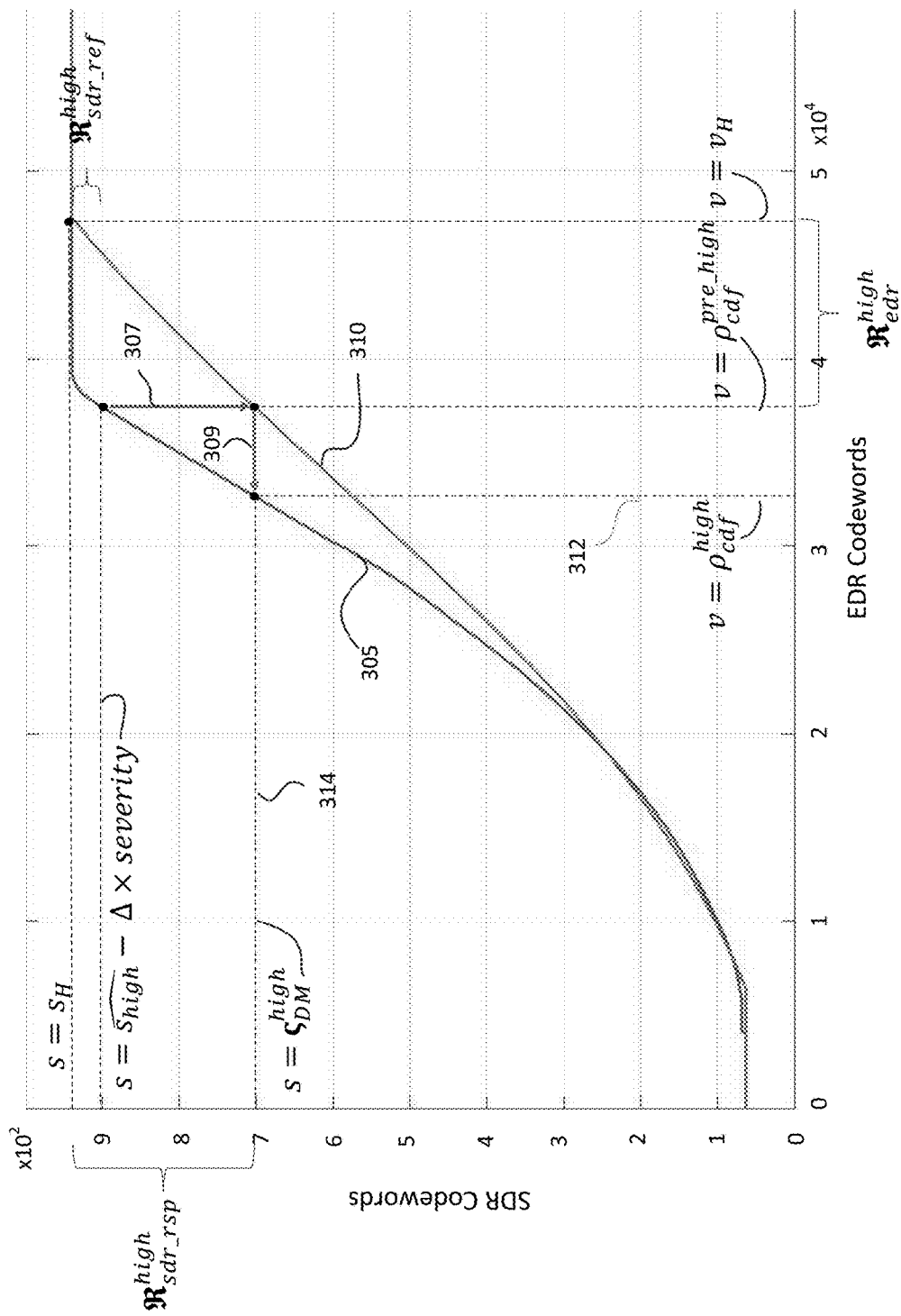
FIG. 3A depicts an example of dynamic range remapping according to a data flow depicted in FIG. 2.

FIG. 3A depicts an example of determining the merging point $\rho_{cdf}^{high}$ (312) given an original CDF matching curve (305) and a DM curve (310). The example assumes clipping in the highlights (high-intensity) region. Given the clipping SDR range $\mathfrak{R}_{sdr\_ref}^{high} = [\hat{s}_{high} - \Delta \times severity, s_H]$, from the CDF curve (305), one can determine the corresponding EDR region $\mathfrak{R}_{edr}^{high} = [\rho_{cdf}^{pre\_high}, v_H]$ (follow arrow 307). This EDR region should have been ideally mapped to the SDR range $\mathfrak{R}_{sdr\_rsp}^{high} = [\zeta_{DM}^{high}, s_H]$. Using the example DM curve (310), arrow (309) shows the way to get the truly affected SDR range, starting at $\zeta_{DM}^{high}$ (314).

CDF Matching Curve Adjustment

Let $f'_{cdf}(\bullet)$ denote the first derivative of $f_{cdf}(v)$. Let $T'(\bullet)$ denote the derivative of the DM curve.

$$f'_{cdf}(v) = f_{cdf}(v) - f_{cdf}(v-1) \ \forall v > 0$$

$$f'_{cdf}(0) = 0$$

$$T'(v) = T(v) - T(v-1) \forall v > 0$$

$$T'(0) = 0 \qquad (27)$$

Low Intensity Trim Correction

The CDF curve in the low intensity range $[v_L \ \rho_{cdf}^{low}]$ should be suitably modified to fix the trim clipping effect. The number of the total codewords in the affected intensity range for DM and CDF curves is computed as:

$$\alpha_{CDF}^{low} = \sum_{v=v_L}^{\rho_{cdf}^{low}} f'_{cdf}(v), \qquad (28)$$

$$\alpha_{DM}^{low} = \sum_{v=v_L}^{\rho_{cdf}^{low}} T'(v). \qquad (29)$$

The number of codewords in the corresponding areas of the CDF and DM curves might be different, that is, $\alpha_{cdf} \neq \alpha_{DM}$. Care has to be taken that while modifying the CDF curve taking into consideration the DM mapping, that one replaces the affected areas with the same amount of codewords from DM, otherwise one will have to borrow codewords from the mid-tone section and that will affect the director's intent. To preserve the mid-tones, let $\hat{f}'_{cdf,dm}(\bullet)$ represent the modified derivative of the original CDF matching LUT, where $$\hat{f}'_{cdf,dm}(v) = \frac{\alpha_{CDF}^{low}}{\alpha_{DM}^{low}} \times T'(v) \ \forall \ v \in [v_L \ \rho_{cdf}^{low}], \qquad (30)$$

and $$\hat{f}'_{cdf,dm}(v) = f'_{cdf}(v) \text{ otherwise.}$$

High Intensity Trim Correction

For the highlight regions, the values will change according to the equations $$\alpha_{CDF}^{high} = \sum_{v=\rho_{cdf}^{high}}^{v_H} f'_{cdf}(v), \qquad (31)$$

$$\alpha_{DM}^{high} = \sum_{v=\rho_{cdf}^{high}}^{v_H} T'(v), \qquad (32)$$

$$\hat{f}'_{cdf,dm}(v) = \frac{\alpha_{CDF}^{high}}{\alpha_{DM}^{high}} \times T'(v) \ \forall \ v \in [\rho_{cdf}^{high} \ v_H],$$

and $$\hat{f}'_{cdf,dm}(v) = f'_{cdf}(v) \text{ otherwise.} \qquad (32)$$

Next, the new differential CDF matching Forward LUT is integrated to form the cumulative (modified) CDF LUT $f_{cdf,dm}(v) \rightarrow s$, where $$f_{cdf,dm}(0) = f_{cdf}(0), \qquad (34a)$$

$$f_{cdf,dm}(v) = \hat{f}'_{cdf,dm}(v) + f_{cdf,dm}(v-1) \forall v > 0. \qquad (34b)$$

Henceforth, the modified CDF Forward LUT $f_{cdf,dm}(v)$ replaces the original CDF matching curve. The new curve $f_{cdf,dm}(v)$ maps the reference EDR values to reshaped SDR values. The curve may be inverted to produce a Backward reshaping LUT (160) to be transmitted as part of the metadata (124).

Figure 3B:
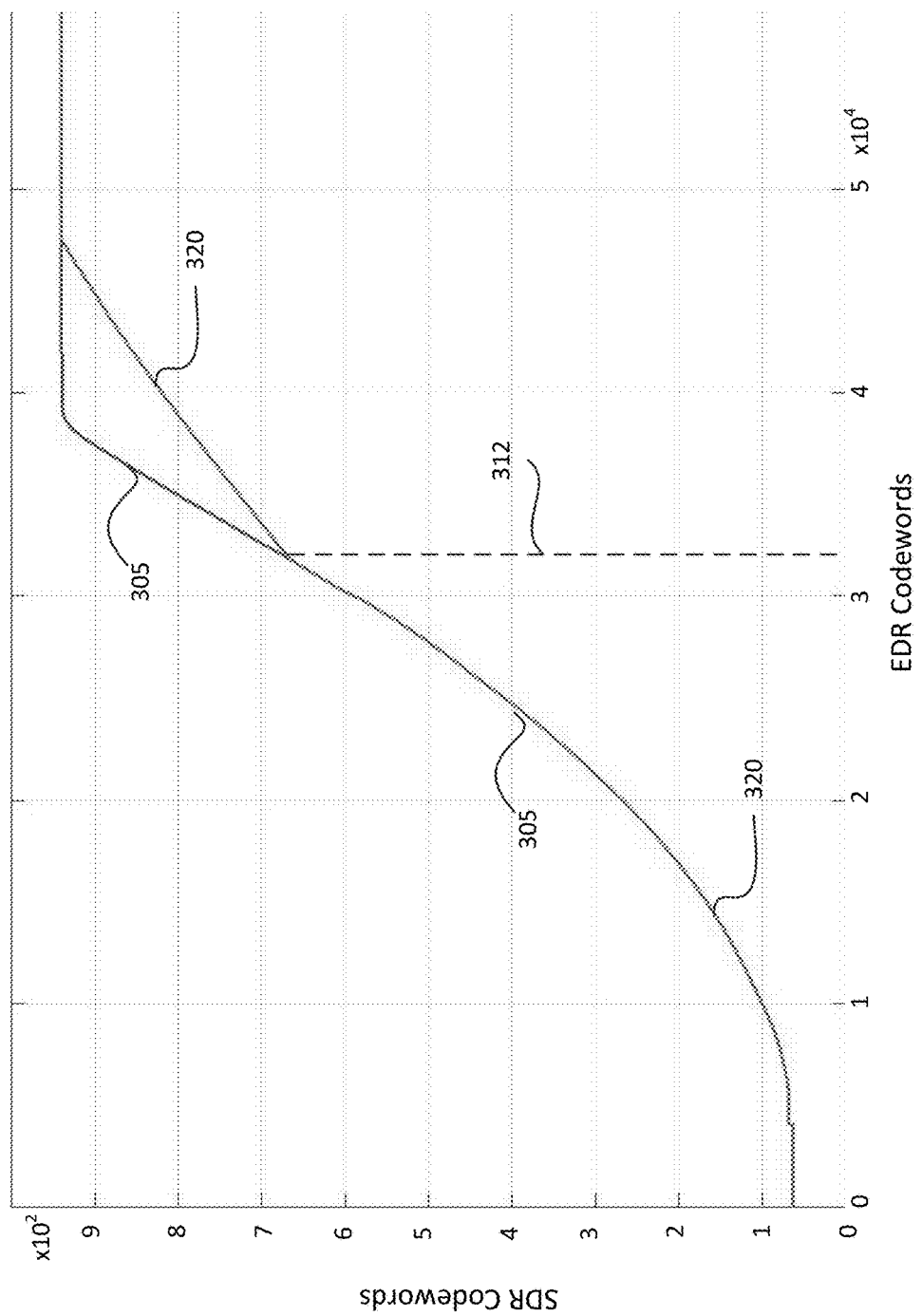
FIG. 3B depicts an example of an original CDF matching function and a modified CDF matching function, modified according to an embodiment of this invention.

As an example, in FIG. 3B, given the original CDF matching function (305), plot (320) depicts the corresponding modified CDF matching function. Note that the two functions are identical in the darks and in the mid-tones regions (from $v=v_L$ to $v=\rho_{cdf}^{high}$ (312)), but in the highlights the modified CDF redistributes the allocated SDR codewords to reduce the potential for clipping errors.

In the methods described so far, reshaping functions are updated at the scene level. These methods can be easily extended for embodiments where reshaping functions are determined and updated at the frame level. For example, in an embodiment, instead of computing scene-based histograms (see equations (2) and (4)) one may compute the histograms based on a window of frames surrounding the frame under consideration. For example, such a window may include W frames before the current frame (e.g. W=5) and W frames after the current frame, for 2W+1 total frames, under the constraint that the borders of such a window can't go beyond a scene cut before or after the current frame. This window method ensures temporal consistency across adjacent frames in the sequence, which improves overall coding efficiency and reduces coding-related artifacts.

Figure 4A:
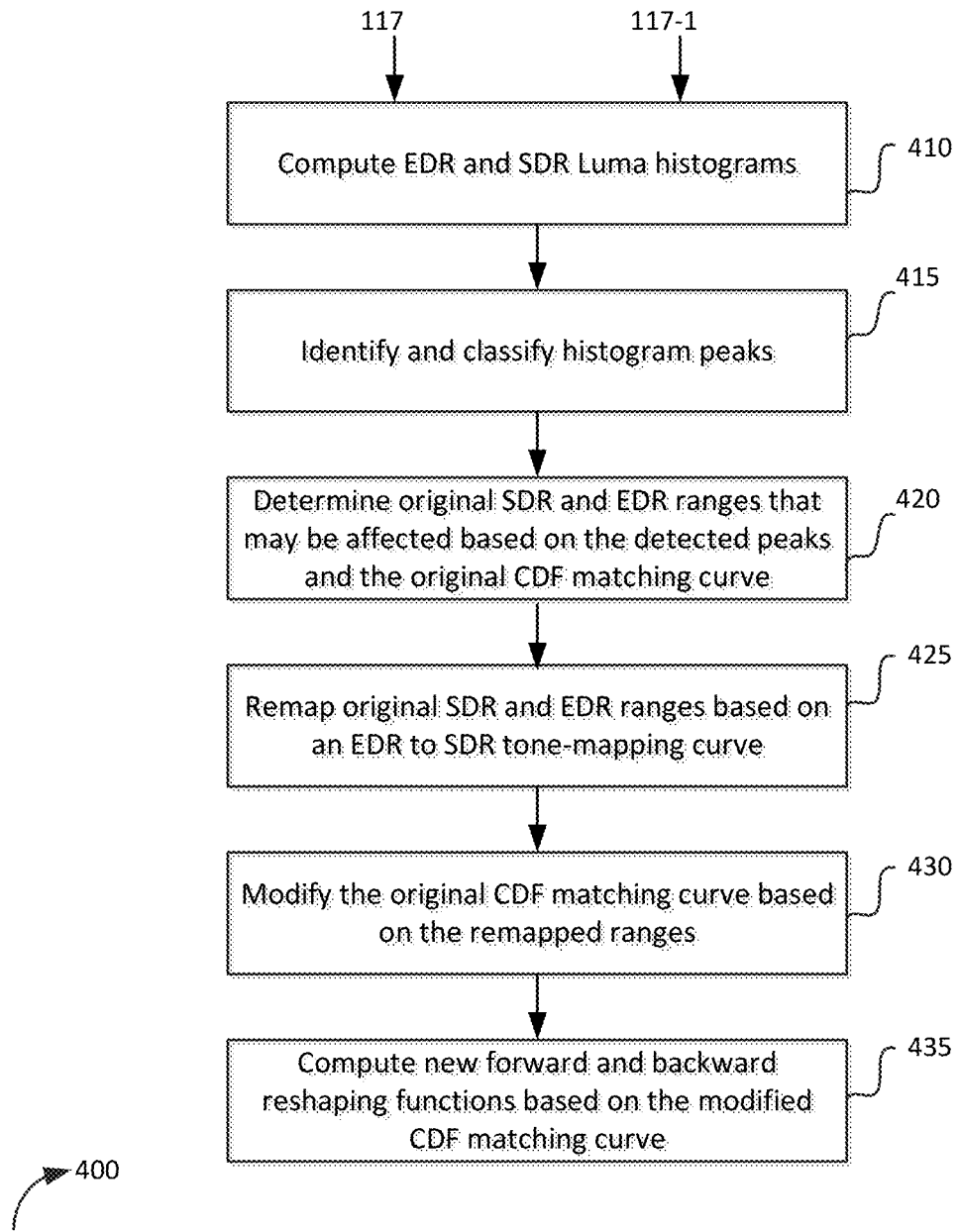
FIG. 4A and FIG. 4B depict example processes for reshaping curve optimization according to embodiments of this invention.

FIG. 4A depicts an example process flow (400) for optimizing a reshaping curve to reduce visible artifacts due to a trim pass according to an embodiment. Given SDR (117-1) and HDR (117) input data representing the same video sequence, but at two different dynamic ranges, step (410) computes scene-based histograms of the luma pixels (see equations (2) and (4)). Next, step (415) identifies and classifies peaks in the SDR histograms. Two methods were proposed: a) detecting peaks by comparing an original and a smoothed version of the SDR histogram and by applying suitable thresholds to the normalized peaks, (see equation (11)) and/or b) detecting peaks by computing cross-domain variance values, based on the original CDF matching function and the EDR histogram, and then comparing them with a threshold (see equation (15)). Since artifacts may occur beyond the codeword bins where peaks are detected, step (420) identifies the original range of SDR and EDR values of interest. In step (425), the ranges of step (420) are adjusted to determine "merging points" in the input EDR domain by combining the characteristics of an EDR to SDR mapping function and the original CDF matching function (see equation (26)). Given these merging points, step (430) determines a modified CDF matching curve to map input EDR values to reshaped SDR values. Finally, in step 435, a modified forward and backward reshaping function is generated based on the modified CDF matching curve. The modified forward reshaping function compensates for the editor's edits during the trim pass. After backward reshaping, a viewer of the received EDR data should experience video with reduced artifacts, while the video still maintains the director's intent.

Figure 4B:
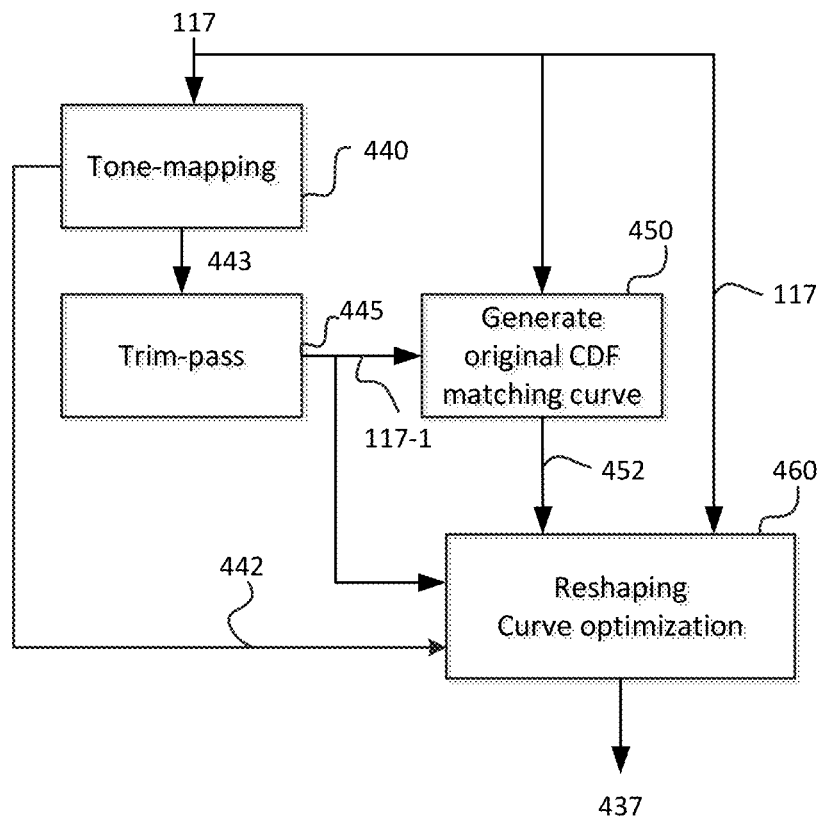

FIG. 4B depicts another example process flow for optimizing a reshaping curve to reduce visible artifacts due to a trim pass according to an embodiment. Given a high-dynamic range input (117), a tone-mapping process (440) may be applied to the HDR input to generate an LDR image (443) in a lower dynamic range. A trim-pass process (445) may be applied to this LDR image to generate a "reference" LDR (or SDR) image (117-1) according to the director's intent in a target dynamic range. Using the original HDR image (117) and the trim-passed version, step 450 generates an original CDF matching curve (452). If the original CDF curve is applied directly to generate forward and backward reshaping functions, then due to the trim-pass process, the reconstructed HDR image may display artifacts. Instead, using the original tone-mapping function (442), the HDR input (117), the reference SDR input (117-1), and the original CDF curve (452), step 460 (e.g., process 400 in FIG. 4A) generates a new CDF matching curve (437), which can be used to generate both a forward and backward reshaped function, such that artifacts due to the trim process may be reduced or eliminated.

Generating a Backward Reshaping Function

Let FL(v) denote the forward reshaping LUT, that is, for each EDR input $v_i$, FL($v_i$) outputs the corresponding reshaped LDR (e.g., SDR) value. For example, in some embodiments, FL( ) may be a look-up representation of $f_{cdf,dm}(v)$ in equation (34). In other embodiments, FL( ) maybe derived from a smoothened (e.g., low-pass filtered) version of $f_{cdf,dm}(v)$. For each reshaped codeword value, $s_c$, used in reshaped video content, all pixels (e.g., in an image, in images of the same scene, etc.) having the same reshaped codeword value $s_c$ in the reshaped video content are grouped. Based on these pixels in the reshaped video content, a set of corresponding source codewords values vi in source video content which have been reshaped or mapped to $s_c$ are then determined or identified, as follows:

$$\omega(s_c) = \{i | FL(i) = s_c\}. \quad (35)$$

For each codeword value $s_c$, if its set of corresponding source codeword values $v_i$ is not empty, then the average for all the collected source codeword values in the set is taken or computed. The average of all the collected source codeword values corresponding to each codeword value $s_c$ may be used to construct a backward reshaping LUT BL($s_c$), as follows, $$BL(s_c) = \frac{\sum_{i \in \omega(s_c)} v_i}{|\omega(s_c)|}, \quad (36)$$

where $|\omega(s_c)|$ represents the number of the collected source codeword values generated using equation (35) above.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
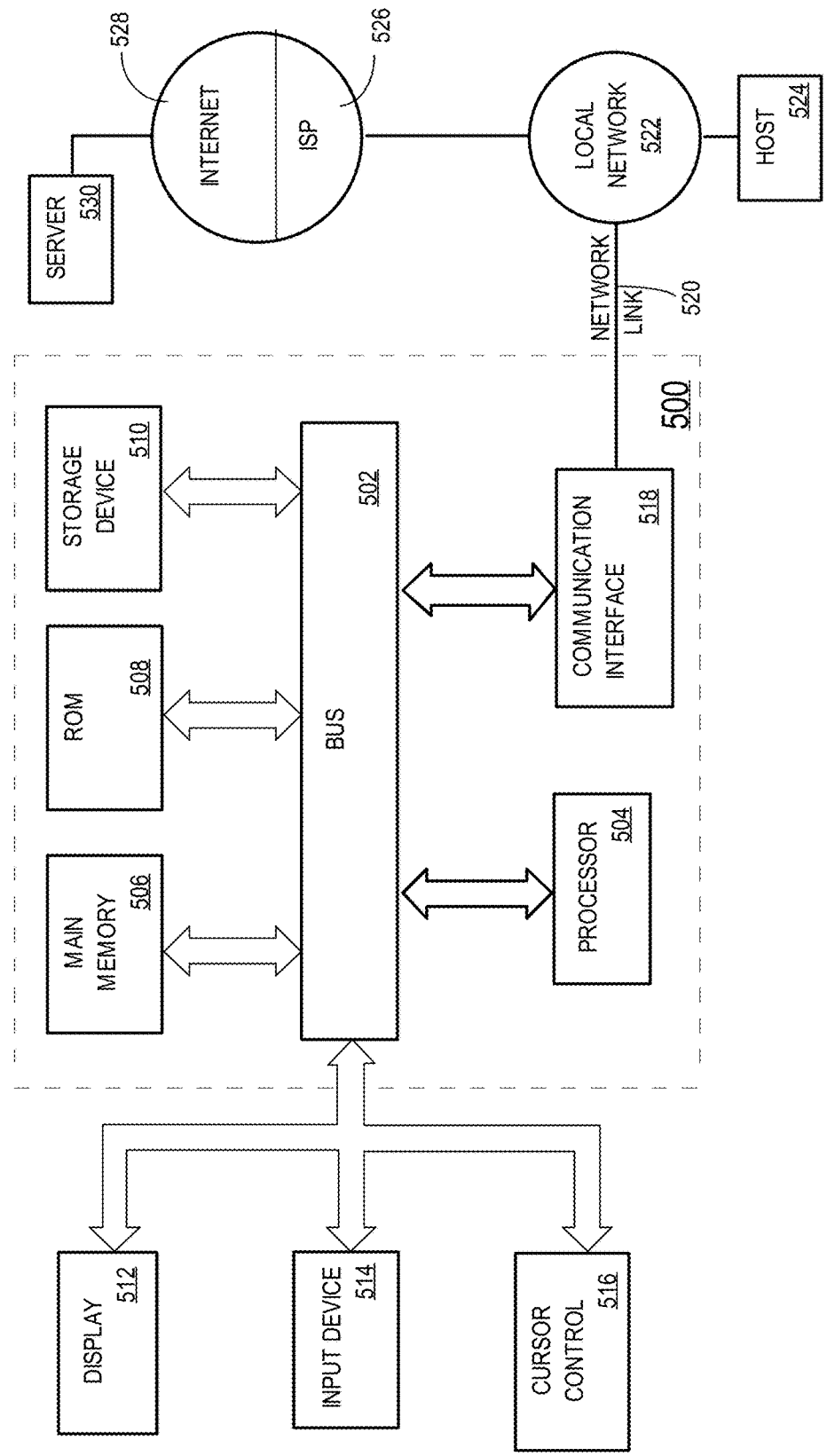
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated-services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for generating a reshaping function and encoding video frames with a processor, the method comprising:

receiving with the processor a first video frame in a first dynamic range;

receiving a second video frame in a second dynamic range, wherein the first and the second frames represent the same scene;

receiving a tone-mapping function mapping luminance pixel values from the first dynamic range to luminance pixel values in the second dynamic range;

receiving a first cumulative density function (CDF) matching curve which maps luminance values from the first dynamic range to reshaped luminance values in the second dynamic range;

generating a first histogram of luminance values based on luminance pixel values in the first video frame;

generating a second histogram of luminance values based on luminance pixel values in the second video frame;

generating one or more histogram peaks based on the first and second histograms of luminance values and the first CDF matching curve, wherein generating the one or more histogram peaks comprises:

smoothing the second histogram with a smoothing filter to generate a smoothed histogram;

computing a histogram of element-wise differences between corresponding codeword values in the second histogram and the smoothed histogram;

normalizing the element-wise differences to be between 0 and 1; and determining there is a histogram peak if a normalized element-wise difference is larger than a peak-detection threshold;

generating a first luminance pixel range in the first dynamic range based on the one or more histogram peaks and the first CDF matching curve;

generating a second luminance pixel range in the first dynamic range based on the first luminance pixel range, the first CDF matching curve, and the tone-mapping function;

generating a second CDF matching curve based at least on the second luminance pixel range, the first CDF matching curve, and the tone-mapping function;

generating a forward reshaping function based on the second CDF matching curve;

applying the forward reshaping function to the first video frame to generate a reshaped video frame;

generating a backward reshaping function based on the second CDF matching curve;

compressing the reshaped video frame to generate a compressed video frame; and combining the compressed video frame and the backward reshaping function to generate a coded bitstream.

2. The method of claim 1, wherein computing a histogram of element-wise differences ($hist_{peaks}^{sdr}(S)$) between corresponding codeword values in the second histogram and the smoothed histogram comprises computing:

$$hist_{peaks}^{sdr}(s) = \max(0, hist^{sdr}(s) - hist_{smooth}^{sdr}(s)), s \in [0, 2^{B_T}-1],$$

where $B_T$ denotes the bit-depth in the second dynamic range, $hist^{sdr}(s)$ denotes the second histogram, and $hist_{smooth}^{sdr}(s)$ denotes the smoothed histogram.

3. The method of claim 2, wherein determining there is a histogram peak at s comprises computing that $hist_{peaks}^{sdr,norm}(s) > T_1$, wherein $hist_{peaks}^{sdr,norm}(s)$ denotes the normalized values of $hist_{peaks}^{sdr}(s)$.

4. The method of claim 1, further comprising:

computing a cross-domain variance for codeword values in the second dynamic range based on values of the first CDF matching curve and the first histogram; and determining there is a histogram peak if a cross-domain variance value is larger than a second peak-detection threshold.

5. The method of claim 1, wherein generating a first luminance pixel range in the first dynamic range based on the one or more histogram peaks and the first CDF matching curve comprises:

computing an SDR reference range in the second dynamic range based on a histogram peak; and mapping the SDR reference range to the first luminance pixel range based on the first CDF matching curve.

6. The method of claim 5 wherein the SDR reference range is a low intensity range based on a peak in low-intensity codewords or a high intensity range based on a peak in high-intensity codewords.

7. The method of claim 5, wherein a low intensity range is computed as:

$$\mathcal{R}_{sdr\_ref}^{low} = [s_L, \hat{s}_{low} + \Delta \times \text{severity}],$$

where $\hat{s}_{low} \in [0, 2^{B_T-1})$ denotes a peak location, $B_T$ denotes the bit-depth in the second dynamic range, $s_L$ denotes the smallest codeword value in the second dynamic range, severity is a constant denoting a severity metric of the peak, and $\Delta$ denotes a constant.

8. The method of claim 7, wherein the first luminance range is computed as $$\mathcal{R}_{edr}^{low} = [v_L, \rho_{cdf}^{pre\_low}],$$

where $\rho_{cdf}^{pre\_low} = \min\{v \mid f_{cdf}(v) = \hat{s}_{low} + \Delta \times \text{severity}\}$, where $v_L$ denotes the smallest codeword value in the first dynamic range and $f_{cdf}(V)$ denotes the first CDF matching curve.

9. The method of claim 1, wherein generating a second luminance pixel range in the first dynamic range based on the first of luminance pixel range, the first CDF matching curve, and the tone-mapping function, comprises:

computing a reshaped SDR range in the second dynamic range based on the first luminance pixel range, a scaler, and the tone mapping function; and mapping the reshaped SDR range to the second luminance pixel range based on the first CDF matching curve.

10. The method of claim 9, wherein computing a reshaped SDR range in the second dynamic range based on the first luminance pixel range, a scaler, and the tone mapping function comprises computing:

$$\zeta_{DM}^{low} = \max(\text{slope} \times \{T(\rho_{cdf}^{pre\_low}) - T(v_L)\} + s_L, \hat{s}_{low} + \Delta \times \text{severity}),$$

wherein slope denotes the scaler, $T( )$ denotes the tone-mapping function, $\hat{s}_{low} \in [0, 2^{B_T-1})$ denotes a peak location in a low intensity range, $B_T$ denotes the bit-depth in the second dynamic range, $s_L$ denotes the smallest codeword value in the second dynamic range, severity is a constant denoting a severity metric of the peak, $\Delta$ denotes a constant, $v_L$ denotes the smallest codeword value in the first dynamic range, and $[V_L, \rho_{cdf}^{pre\_low}]$ denotes the first luminance pixel range.

11. The method of claim 10, wherein mapping the reshaped SDR range to the second luminance pixel range based on the first CDF matching curve, comprises computing:

$$\rho_{cdf}^{low} = \min\{v \mid f_{cdf}(v) = \zeta_{DM}^{low}\},$$

where $f_{cdf}(v)$ denotes the first CDF matching curve and $\zeta_{DM}^{low}$ denotes a boundary of the reshaped SDR range.

12. The method of claim 1, wherein generating a second CDF matching curve based on the second luminance pixel range, the first CDF matching curve, and the tone-mapping function, comprises:

computing the first derivative of the first CDF matching curve;

computing the first derivative of the tone mapping function;

computing a modified first derivative of the first CDF matching curve based on the second luminance pixel range, and the first derivatives of the first CDF matching curve and the tone mapping function; and computing an integral of the modified first derivative of the first CDF matching curve to generate a modified CDF matching curve which maps luminance pixel values in the first dynamic range to reshaped luminance pixel values in the second dynamic range.

13. The method of claim 12, wherein computing a modified first derivative ($\hat{f}'_{cdf,dm}(v)$) of the first CDF matching curve comprises computing:

$$\alpha_{CDF}^{low} = \sum_{v=v_L}^{\rho_{cdf}^{low}} f'_{cdf}(v),$$

$$\alpha_{DM}^{low} = \sum_{v=v_L}^{\rho_{cdf}^{low}} T'(v).$$

$$\hat{f}'_{cdf,dm}(v) = \frac{\alpha_{CDF}^{low}}{\alpha_{DM}^{low}} \times T'(v) \, \forall \, v \in [v_L, \rho_{cdf}^{low}],$$

and $$\hat{f}'_{cdf,dm}(v) = f'_{cdf}(v) \text{ otherwise,}$$

wherein $f'_{cdf}(v)$ denotes the first derivative of the first CDF matching curve, T'(v) denotes the first derivative of the tone mapping function and $v \in [v_L, \rho_{cdf}^{low}]$ denotes the second pixel luminance range for a peak in a low intensity region.

14. The method of claim 13, wherein generating the modified CDF matching curve comprises computing $$f_{cdf,dm}(0) = f_{cdf}(0),$$

$$f_{cdf,dm}(v) = \hat{f}'_{cdf,dm}(v) + f_{cdf,dm}(v-1) \forall v > 0,$$

wherein $f_{cdf,dm}(v)$ denotes the modified CDF matching curve.

15. The method of claim 1, further comprising:

in a decoder, receiving the coded bitstream;

extracting from the coded bitstream with the processor in the decoder the compressed video frame and the backward reshaping function;

decoding the compressed video frame to generate a decoded reshaped frame in the second dynamic range; and generating a decoded output frame in the first dynamic range based on the decoded reshaped frame in the second dynamic range and the backward reshaping function.

16. A method for generating a reshaping function and encoding video frames with a processor, the method comprising:

receiving with the processor a first video frame in a first dynamic range;

applying a tone-mapping function to the first video frame to generate a second video frame in a second dynamic range, wherein the tone-mapping function maps luminance pixel values from the first dynamic range to luminance pixel values in the second dynamic range;

applying a trim pass to the second video frame to generate a third video frame in a target dynamic range;

generating based on the first and the third video frames a first cumulative density function (CDF) matching curve which maps luminance values from the first dynamic range to reshaped luminance values in the target dynamic range;

generating a second CDF matching curve based on the first and third video frames, the first CDF matching curve, and the tone-mapping function;

generating a forward reshaping function based on the second CDF matching curve;

applying the forward reshaping function to the first video frame to generate a reshaped video frame;

generating a backward reshaping function based on the second CDF matching curve;

compressing the reshaped video frame to generate a compressed video frame; and combining the compressed video frame and the backward reshaping function to generate a coded bitstream.

17. A computer system configured to perform the method recited in claim 1.

18. An apparatus configured to perform the method recited in claim 1.

19. A non-transitory computer-readable storage medium having stored thereon computer-executable instruction for executing the method in accordance with claim 1.

* * * * *